United States Patent [19]

Bausch

[11] Patent Number: 4,987,788
[45] Date of Patent: Jan. 29, 1991

[54] ELECTRIC MOTOR-DRIVEN POSITIONING ELEMENT

[75] Inventor: Paul Bausch, Hattenheim, Fed. Rep. of Germany

[73] Assignee: General Motors Corporation, Detroit, Mich.

[21] Appl. No.: 425,135

[22] Filed: Oct. 23, 1989

[30] Foreign Application Priority Data

Oct. 25, 1988 [DE] Fed. Rep. of Germany ....... 3836255

[51] Int. Cl.$^5$ .................. F16H 25/22; F16H 1/28; B62D 7/14
[52] U.S. Cl. .................. 74/89.15; 74/424.8 NA; 180/140; 192/1.39; 310/83; 475/331; 475/337
[58] Field of Search ..... 74/89.15, 424.8 R, 424.8 NA, 74/459; 192/1.39; 180/140; 280/91; 475/331, 337; 310/83

[56] References Cited

U.S. PATENT DOCUMENTS

| | | | |
|---|---|---|---|
| 2,295,076 | 9/1942 | Cochran | 475/331 X |
| 2,966,070 | 12/1960 | Wise | 475/331 X |
| 3,161,074 | 12/1964 | Korthaus et al. | 192/1.39 X |
| 4,579,012 | 4/1986 | Mabie et al. | 74/89.15 |
| 4,603,594 | 8/1986 | Grimm | 74/89.15 |
| 4,895,383 | 1/1990 | Abe et al. | 180/140 X |

FOREIGN PATENT DOCUMENTS

| | | |
|---|---|---|
| 3416938 | 12/1984 | Fed. Rep. of Germany . |
| 3629453 | 3/1988 | Fed. Rep. of Germany . |
| 3705528 | 9/1988 | Fed. Rep. of Germany . |
| 63-184575 | 7/1988 | Japan ................... 180/140 |
| 627004 | 7/1949 | United Kingdom ........ 475/337 |

*Primary Examiner*—Allan D. Herrmann
*Attorney, Agent, or Firm*—Mark A. Navarre

[57] ABSTRACT

In an electric motor-driven positioning element for steering the rear wheels of a passenger car, a rotor of an electric motor is mounted on a ball nut which is adapted to effect axial displacement of a ball screw. The ball nut supports on a flange the shafts of pinions of a planetary gear unit, with the sun wheel of that planetary gear unit being driven by the rotor of the electric motor. The housing accommodates an electro-magnetic dog clutch which serves to block the ball nut during the time the electric motor is not energized.

8 Claims, 3 Drawing Sheets

ELECTRIC MOTOR-DRIVEN POSITIONING ELEMENT

This invention relates to an electric motor-driven positioning element, especially for steering a rear wheel of a passenger car, wherein a ball screw, which functions as the positioning member, is accommodated in a housing and is axially displaced by a ball nut, and wherein the ball nut is driven by an electric motor via a planetary gear set, with the rotor of the electric motor driving a sun gear, and the planetary pinions, which are in mesh with the sun gear, driving the ball nut. A positioning element of this type has been disclosed in German DE-OS No. 37 35 517.

This prior positioning element is arranged in the same fashion as the steering gear for the front axle of a passenger car. It has two positioning members projecting from its end walls for actuating a tie rod which, in turn, is adapted to move the steering arms of the rear wheels. In this positioning element, the ball screw, the planetary gear unit and the electric motor are arranged one after the other on the ball screw. As a result of this arrangement, the positioning element is relatively long. Furthermore, because of the many components used in this arrangement, the positioning element is relatively heavy. Nevertheless, the high weight and large size are shortcomings that may still fall within the boundaries of acceptability.

However, for the sake of simplicity, it is desirable that one positioning element be provided for each rear wheel. A rear axle of this type has been disclosed in the German publication DE-OS No. 31 39 792. The positioning element for such a rear axle steering system must be relatively compact to be suitable for mounting adjacent the wheel guide member. Since the positioning element in this type of arrangement increases the unsprung mass of the vehicle, it must also be relatively light in weight. To meet both of these requirements, the positioning element according to DE-OS No. 31 39 792 is in the form of a hydraulic positioning cylinder.

It is the object of the present invention to provide an electric motor-driven positioning element of the type described above which is relatively compact and light in weight so that it can be attached to a semi-trailing arm of a rear wheel axle.

This is accomplished in accordance with the present invention in that the ball nut is in the form of a hollow shaft, and in that the rotor of the electric motor is rotatably mounted on the ball nut.

This arrangement will provide that the ball nut, the planetary gear unit and the electric motor, rather than being mounted in succession, are mounted within one another, thereby making the assembly much shorter than that according to DE-OS No. 37 35 517. The novel positioning element is also relatively simple in construction and light in weight.

In accordance with one advantageous embodiment according to the invention, which renders the positioning element relatively simple in structure, the shafts of the pinion gears are supported in a flange of the ball nut forming a pinion gear carrier, and the pinion gears are meshing with stationary internal toothing of the housing which functions as the ring gear. A positioning element of this type may have a relatively high gear ratio when used in combination with a planetary gear unit according to the invention.

Further simplification is achievable if the two end portions of the ball nut are journalled in the housing by means of a bearing fitted radially outwardly of said end portions.

To double the gear ratio of the planetary gear unit, the invention proposes that the shafts of the planetary pinions be arranged on a carrier which is rotatably mounted on the ball nut, said carrier having on the side facing away from the electric motor, another sun gear for engagement with planetary pinions which are journalled on the flange of the ball nut which forms the pinion cage, and that all planetary pinions are meshing with the stationary internal toothing of the housing.

To prevent wheel force induced reverse movement of the steering wheel at the end of the steering event, the invention proposes that an electro-magnetic dog brake be fitted into the housing for blocking the ball nut when the electric motor is deenergized.

In accordance with another feature of the invention, the dog brake can be rendered relatively simple in structure in that it is provided with a brake disc which is nonrotatably mounted on a collar of the ball nut facing away from the electric motor, said brake disc being biased by a spring against the end wall of the housing and being provided on the side of the spring with an annular magnet for axially displacing the brake disc against the bias of the spring.

In order for the retaining force of the brake to be relatively high, the brake disc is provided on the side facing the housing with toothing, and the end wall of the housing is provided with complementary toothing for intermeshing with the brake disc toothing.

For mounting the positioning element between a wheel steering element and a steering knuckle arm, it is preferable that the housing be completed closed at one end and be provided there with a mounting lug, and that the free end of the ball screw extending out of the other end wall be fashioned so as to enable connection to a steering arm of a steered wheel.

It should be appreciated that a variety of arrangements may be utilized in the practice of the invention. To convey the concept of the invention, two exemplary embodiments are illustrated in the drawings and described in the following.

Figure 1:
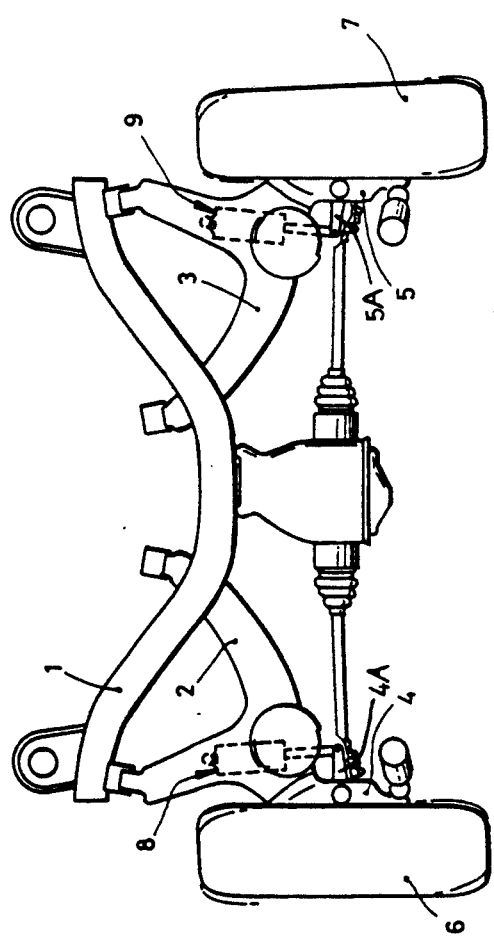
FIG. 1 is a plan view of a semi-trailing arm axle with the positioning elements embodying the invention.

The semi-trailing arm axle illustrated in FIG. 1, has an auxiliary frame 1 to which two semi-trailing arms 2, 3 are articulated. The semi-trailing arms 2, 3 have respective steering knuckles 4, 5 which are adapted for pivoting movement relative to the trailing arms and which have mounted thereto, respectively, wheels 6, 7. Steering movement of the vehicle wheels 6, 7 is effected by electric motor-driven positioning elements 8, 9, respectively, which are mounted, respectively, between the semi-trailing arms 2, 3 and a steering arm 4A, 5A of the steering knuckle 4, 5.

Figure 2:
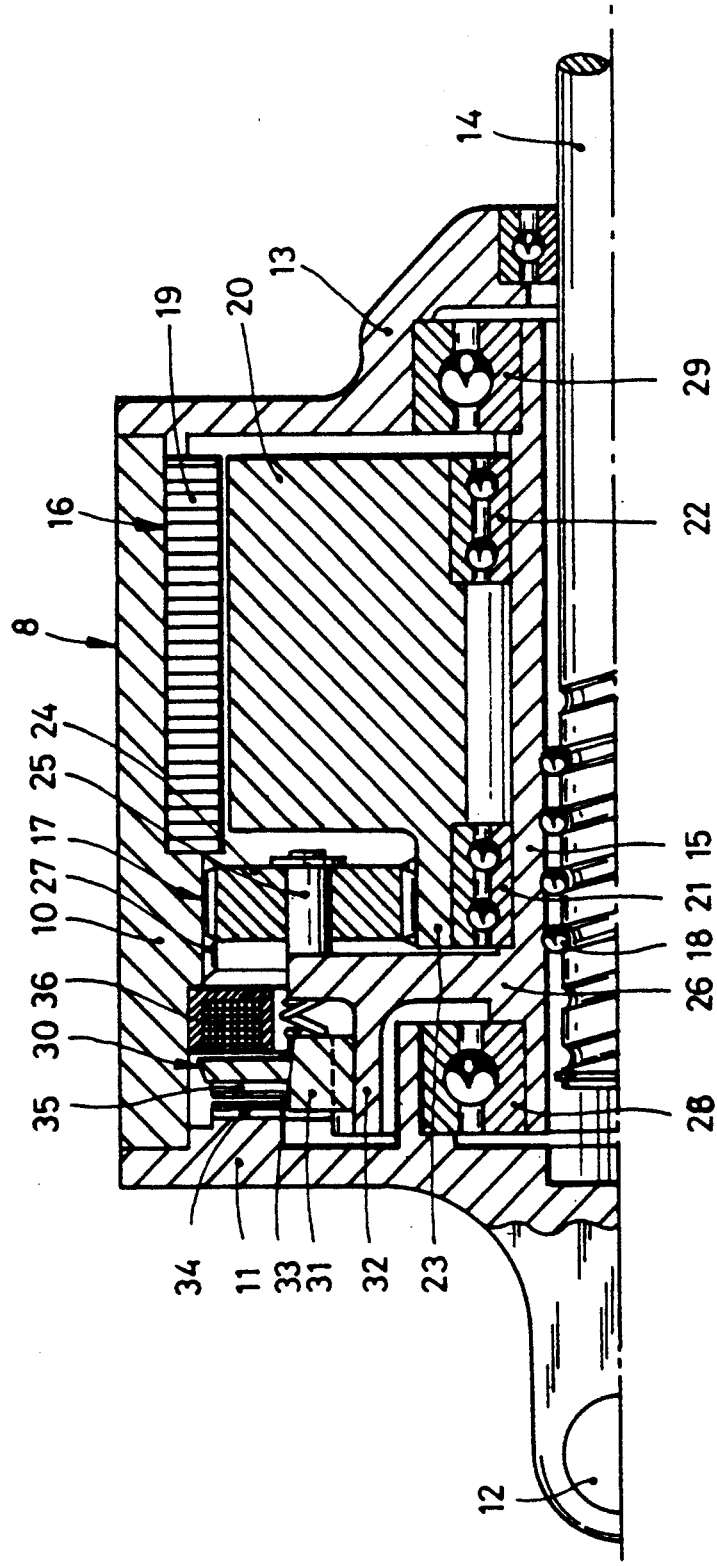
FIG. 2 is a longitudinal section of the upper half of a first embodiment of a positioning element according to the invention.

FIG. 2 illustrates, by way of the exemplary positioning element 8, that the same has a housing 10 which is closed at the left side by an end wall 11 having a mounting lug 12 for connection with the semi-trailing arm 2. On the opposite end, a ball screw 14 is projecting out of the end wall 13. The free end of the ball screw (not illustrated in the drawing) is fashioned in such a manner that makes it suitable for connection with a steering arm 5 of the steering knuckle 4 illustrated in FIG. 1. A ball nut 15 is mounted coaxially to the ball screw 14 in the positioning element 8. This ball nut 15 is adapted to be driven by an electric motor 16 through the intermediacy of a planetary gear unit 17. Turning of the ball nut 15 will cause, by means of the balls 18 engaging the ball nut 15 and the ball screw 14, the nonrotatable ball screw 14 to be axially displaced in and out of the positioning element 8.

The electric motor has a winding 19 inside the housing 10 and a rotor 20 which is rotatably mounted by means of bearings 21, 22 on a portion of the ball nut which is fashioned like a hollow shaft. On the side facing the planetary gear unit 17, the rotor has a sun gear 23 which is in mesh with planetary pinions 24. Each planetary pinion has a shaft 25 which is journalled in a flange 26 of the ball nut 15. Thus, the flange functions as a pinion carrier. Each pinion 24 is in mesh both with the sun gear 23 as well as with the fixed internal toothing 27 of the housing 10 which performs the function of a ring gear.

It is also apparent from FIG. 2 that the end portions of the ball screw 15 are mounted, respectively, in the end walls 11, 13 of the housing 10 by means of bearings 28, 29.

Another important feature of the invention is the dog brake 30 inside the housing 10. This brake 30 has a brake disc 31 which is mounted for axial displacement, but not for rotation, on a collar 32 which faces away from the electric motor 16 and which is part of the flange 26 of the ball nut 15. A spring 23 is provided for biasing the brake disc 31 towards the end wall 11 of the housing 10. The employment of radial toothing 34, 35 on the brake disc 31 and on the inner side of the end wall 11, respectively, will enable to effect, when the brake disc 31 is in the engaged condition, a form-locking connection between the brake disc 31 and the end wall 11 and, consequently, blocking of the ball nut 15 and the ball screw 14. To effect disengagement of the dog brake 30, an annular magnetic element 36 is arranged on the side of spring 33 which, upon being energized, will pull the brake disc 31 against the force of spring 33 to the right and out of the end wall 34. As the spring 33 is compressed, the spring force balances the magnetic force, maintaining the brake disc 31 in the position shown in FIG. 2. Alternatively, the rightward movement of brake disc 31 could be arrested by a stop formed on collar 32, as would be apparent to a skilled artisan.

Figure 3:
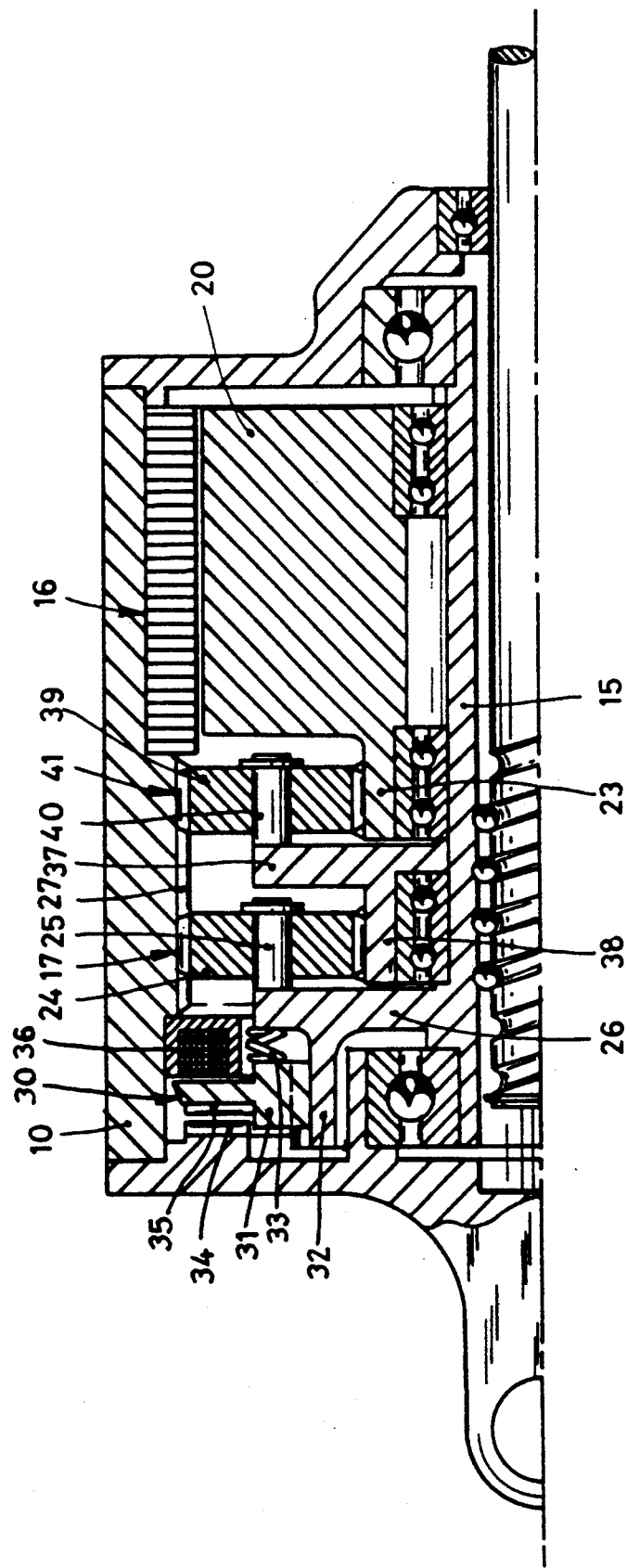
FIG. 3 is a longitudinal section of the upper half of a second embodiment of a positioning element according to the invention.

In the embodiment according to FIG. 3, planetary pinions 39, driven by the sun gear 23 of rotor 20, are being retained through their respective shafts 40 on a carrier element 37 which is rotatably mounted on the ball nut 15. The carrier 37 has arranged therein in coaxial relationship to the sun gear 23, another sun gear 38, and the planetary pinions 24, which are in mesh with said sun gear 38, are each retained through their respective shafts 25 on the flange 26 of the ball nut 15. All planetary pinions 24, 39 are in mesh with the internal toothing 27 of the housing 10 which in this embodiment must be wider than the one described earlier. In this configuration, a second planetary gear unit 41 is positioned ahead of the unit 17 so that the speed of rotor 20 is reduced twice.

The embodiments of the invention in which an exclusive property or privilege is claimed are defined as follows:

1. An electric motor-driven positioning element for steering a rear wheel of a passenger car, including a housing with a positioning member in the form of a ball screw which is adapted for axial displacement effected by a rotatable ball nut, and wherein the ball nut is driven by an electric motor via a planetary gear unit, with the rotor of the electric motor driving a sun gear, and the sun gear intermeshing with planetary pinions driving the ball nut, the improvement wherein: the ball nut is a hollow shaft, and the rotor of the electric motor is rotatably mounted on the ball nut.

2. The electric motor-driven positioning element of claim 1, wherein: the planetary pinions have shafts mounted on a flange of the ball nut which is fashioned into a pinion carrier, and in that the planetary pinions are in mesh with a stationary internal toothing of the housing which functions as a ring gear.

3. The electric motor-driven positioning element of claim 1, wherein: the ball nut is mounted in the housing by means of bearings which are fitted radially outwardly onto the ball nut.

4. The electric motor-driven positioning element of claim 1, wherein: the shafts of the planetary gears are positioned on a pinion carrier which is mounted for rotation on the ball nut and which has, on the side facing away from the electric motor, another sun gear which is in mesh with planetary pinions, with the planetary pinions being mounted on a flange of the ball nut which performs the function of a planetary pinion carrier, and in that all planetary pinions are in mesh with fixed internal toothing of the housing which functions as a ring gear.

5. The electric motor-driven positioning element of claim 1, wherein: the housing contains an electro-magnetic dog brake for blocking the ball nut during the time the electric motor is not energized.

6. The electric motor-driven positioning element of claim 5, wherein: the dog brake has a clutch disc which is nonrotatably mounted on a collar of the ball nut, with the collar facing oppositely the electric motor, said brake disc being biased by the force of a spring against the end wall of the housing, and an annular magnetic element being arranged on the side of said spring for axially displacing the brake disc against the force of said spring.

7. The electric motor-driven positioning element of claim 6, wherein: the brake disc on the side facing the end wall of the housing, and the end wall of the housing are provided, respectively, with radial toothing which are adapted to mesh with one another.

8. The electric motor-driving positioning element of claim 1, wherein: on one side the housing is completely closed and is provided with a mounting lug, and in that the ball screw projecting from the other side of said housing is connected to a steering arm of said rear wheel.

* * * * *